United States Patent
Hsu (10) Patent No.: US 11,260,466 B2
(45) Date of Patent: Mar. 1, 2022

(54) WIRE SHUTTLE FOR USE IN WELDING APPLICATIONS

(71) Applicant: Illinois Tool Works Inc., Glenview, IL (US)

(72) Inventor: Christopher Hsu, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 261 days.

(21) Appl. No.: 15/218,959

(22) Filed: Jul. 25, 2016

(65) Prior Publication Data

US 2018/0021874 A1    Jan. 25, 2018

(51) Int. Cl.
| | |
|---|---|
| *B23K 9/127* | (2006.01) |
| *B23K 9/167* | (2006.01) |
| *B23K 10/02* | (2006.01) |
| *B23K 26/08* | (2014.01) |
| *B23K 9/29* | (2006.01) |
| *B23K 9/04* | (2006.01) |
| *B23K 9/02* | (2006.01) |

(Continued)

(52) U.S. Cl.
CPC .......... *B23K 9/1278* (2013.01); *B23K 9/0216* (2013.01); *B23K 9/04* (2013.01); *B23K 9/133* (2013.01); *B23K 9/167* (2013.01); *B23K 9/173* (2013.01); *B23K 9/295* (2013.01); *B23K 9/296* (2013.01); *B23K 10/02* (2013.01); *B23K 26/0876* (2013.01); *B23K 26/211* (2015.10); *B23K 26/34* (2013.01); *B23K 26/702* (2015.10)

(58) Field of Classification Search
CPC ...... B23K 9/0216; B23K 9/1278; B23K 9/30; B23K 9/133; B23K 9/167; B23K 9/173

USPC ................................................ 219/125.12
See application file for complete search history.

(56) References Cited

U.S. PATENT DOCUMENTS

| | | | | |
|---|---|---|---|---|
| 2,421,095 A | * | 5/1947 | Tyrnerjosephm | ...... B23K 9/147 |
| | | | | 219/124.32 |
| 3,832,522 A | * | 8/1974 | Arikawa | .................. B23K 9/09 |
| | | | | 219/125.12 |

(Continued)

FOREIGN PATENT DOCUMENTS

| | | |
|---|---|---|
| CN | 205184023 | 4/2016 |
| DE | 43 15 780 A1 | 11/1994 |

(Continued)

OTHER PUBLICATIONS

PCT, Notification of Transmittal of the International Search Report and the Written Opinion of the International Searching Authority, or the Declaration, in Application No. PCT/US2017/039984 dated Oct. 10, 2017 (15 pages).

(Continued)

*Primary Examiner* — Erin E McGrath (74) *Attorney, Agent, or Firm* — McAndrews, Held & Malloy, Ltd.

(57) ABSTRACT

Apparatuses, systems, and/or methods for welding systems that provide independent control of a contact tip of a welding torch are disclosed. The welding system can include, for example, a welding torch that includes, for example, a contact tip and a pivot in which the contact tip is coupled to the pivot and is configured to provide wire that is fed through the welding torch during a welding operation. The contact tip and the pivot are configured to independently move the contact tip of the welding torch around the pivot during the welding operation.

17 Claims, 6 Drawing Sheets

(51) Int. Cl.
*B23K 26/34* (2014.01)
*B23K 9/173* (2006.01)
*B23K 26/70* (2014.01)
*B23K 26/211* (2014.01)
*B23K 9/133* (2006.01)

(56) References Cited

U.S. PATENT DOCUMENTS

| | | | | |
|---|---|---|---|---|
| 4,019,016 A | * | 4/1977 | Friedman | B23K 9/0216 |
| | | | | 219/125.12 |
| 4,144,992 A | * | 3/1979 | Omae | B23K 9/0286 |
| | | | | 219/125.11 |
| 4,206,862 A | * | 6/1980 | DaCosta | B23K 9/1336 |
| | | | | 219/137.2 |
| 4,401,878 A | * | 8/1983 | Roen | B23K 9/30 |
| | | | | 219/125.11 |
| 4,857,701 A | | 8/1989 | Slavens | |
| 4,926,023 A | * | 5/1990 | Sugitani | B23K 9/30 |
| | | | | 219/125.12 |
| 5,208,442 A | | 5/1993 | Ahola et al. | |
| 2006/0016792 A1 | * | 1/2006 | Uecker | B23K 9/125 |
| | | | | 219/137.71 |
| 2013/0001210 A1 | | 1/2013 | Pagano et al. | |
| 2013/0256287 A1 | * | 10/2013 | Cole | B23K 9/0216 |
| | | | | 219/122 |

FOREIGN PATENT DOCUMENTS

| | | |
|---|---|---|
| FR | 3 008 635 A1 | 1/2015 |
| JP | S48 25018 U | 3/1973 |
| JP | S60 56181 U | 4/1985 |
| JP | H06 15449 A | 1/1994 |
| JP | 5366578 | 8/2010 |
| KR | 101291106 | 10/2012 |
| WO | 2014/147054 A1 | 9/2014 |

OTHER PUBLICATIONS

PCT, Notification Concerning Transmittal of International Preliminary Report on Patentability, in Application No. PCT/US2017/039984 dated Feb. 7, 2019 (7 pages).

Canadian Office Action for CA3030404, dated Feb. 25, 2020, 5 pages.

* cited by examiner

WIRE SHUTTLE FOR USE IN WELDING APPLICATIONS

BACKGROUND

Many heavy equipment fabrications incorporate an open arc gas metal arc welding (GMAW) process, submerged arc welding (SAW) process and cladding process. Tandem arc welding and variations of type of welding are examples of high deposition welding processes employed. Tandem arc welding contains two welding arcs to increase deposition and welding travel speed. However, due to the nature of two arcs, it suffers from downtime issues by keeping the arc lit simultaneously and is unreliable. Further, tandem arc welding suffers from a difficulty to program from complex and bulky tool front end for complex joint geometry, to operate complex two-wire delivery equipment, and to keep both arcs stable without interference. Typically, due to such complexities, tandem arc welding systems can be quite costly to purchase, maintain, and operate. Another high deposition process is submerged arc welding (SAW), but due to the necessity of flux coverage, SAW is limited to certain welding positions (e.g., most commonly in a flat position). SAW can be performed with single arc/wire or multiple arcs/wires. Yet another high deposition process is cladding with GMAW with torch weave and/or wire spin, and hot wire with laser. Extended electrode stickout, electrode negative polarity, metal core wire, and buried arc are other techniques that can improve deposition of arc welding processes with consumable electrode.

High current is needed to provide the melt off of the wire at high deposition. However, one problem of high deposition single wire welding is arc instability from rotational arc metal transfer. The metal transfer forces such as, for example, the electromagnetic pinch force is not able to detach the liquid metal in small amounts, thereby forming an unstable or unpredictable rotating liquid string tethered to the wire end with arc pressure and resulting in excessive spatter and process instability.

Further, high current for high deposition single wire welding can suffer from finger shaped penetration due to the high energy density distribution of the arc from a round wire. The penetration profile can cause the root of the joint to be missed or make the part fit-up in a situation in which wire placement alignment with respect to the joint is critical. This can increase the tooling cost and part dimensional control cost to improve fit-up for a fabricator. Further, joint preparation cost (e.g., necessitating precision laser machining of the joint prior to welding) can also increase. Ultimately, weld quality can be compromised if the pre-welding operations are not controlled.

In addition, high current for high deposition single wire welding can suffer from intense arc gouges on the side walls of the joint and can melt away the weldment surface without filler metal to cover it back up, resulting in an undercut. This problem is even more pronounced when weaving is necessary to compensate for poor joint fit-up, thereby pushing the arc towards the sidewalls of the joint. The side-to-side movement of the arc will likely encroach on the side walls of the joint, melt it, leaves a cavity without filler metal to completely backfill the cavity.

Additionally, robotic weave of the entire torch body may have the limitation of joint accessibility, programming complexity, and the maximum frequency of the weave depending on the payload capacity of the robot and the weight of the weld tool.

In direct-diode, free space delivered laser cladding with hot wire, the laser beam line width may be much wider than wire diameter, for example, up to 12 mm. With zoom homogenizer the variable rectangle may increase up to 80 mm×80 mm. The wire delivery and laser head are usually mounted on the same robot arm making it difficult to weave and spread wire deposition as wide as laser independent of the laser by a robot to increase the swath of deposit that matches with the laser for efficiency.

BRIEF SUMMARY

Apparatuses, systems, and methods for a welding system that includes a wire shuttle system for use in welding applications are provided substantially as illustrated by and/or described in connection with at least one of the figures, as set forth more completely in the claims.

DETAILED DESCRIPTION

Some embodiments of apparatuses, systems, and methods for a welding system that provides a wire shuttle system for use in welding applications are provided.

Some embodiments of apparatuses, systems, and methods for a welding system that provides independent control of a contact tip of a welding torch. While the welding torch is moved in a first direction, the contact tip of the welding torch can be moved a second direction and a third direction, for example. In some embodiments, the second direction or the third direction is in the same direction as the first direction. In some embodiments, the second direction and the third direction are not in the same direction as the first direction.

Some embodiments of apparatuses, systems, and methods for a wire shuttle system for use in welding applications provide a single wire solution instead of a two-wire solution.

Some embodiments of the welding system that use a single wire solution not only provide the deposition rates higher than conventional single arc, but also a high quality weld and a stable welding process.

Typically, when the wire speed is substantially increased to increase deposition, welding current must increase substantially to increase the melt off rate commensurate with the wire feed rate, which can yield the instability associated with rotational spray transfer and the gouging of the sidewalls from high power density. Recent work with very large diameter metal wire (single wire) and spin arc (single wire) all suffer from the same power density limitations. However, the bipolar energy density distribution of the tandem welding arc, i.e., the ¾" to 1" separation between the two arcs can prevent the extreme high power density of a single high current arc that causes undercut on the workpiece and rotational spray process instability.

Some embodiments of the welding system that use the single wire solution provide an arc energy distribution of single wire that is analogous to that of a tandem arc in spatial and thermal distribution, so that the effective high power density on the side wall might have a minimal gouging effect. This might call for a much larger movement of the wire to spread the heat out more broadly. With respect to spacing, the movement can be on the order of the bottom width of the arc cone. With respect to frequency, it can be higher than a robot weave frequency of 5 Hz and possibly higher than a spin frequency of 80 Hz from a spin arc torch.

Some embodiments contemplate that, instead of rotational motion, which is convenient from a mechanical design perspective, the wire move in a zig-zag motion to spread the heat out along the weld travel axis with less risk of cutting into the side walls. The zig-zag motion mechanism inside the torch body moves components that move the wire without moving the torch body. This can be differentiated from the so-called "axial weave" by a robot in that the weave frequency can be much higher than the 4-5 Hz due to there being less inertia to overcome; the high speed weave is not operated by the robot, thereby extending robot motor life; more stationary torch body (travel along weld axis but not weave) provides better joint accessibility; and the wire zig-zag motion can be integral to weld process control from welding equipment as part of a synergic weld process making the robot programming easier and the synergic weld process robot agnostic. Because the change of direction at the two ends of the stroke, the zig-zag motion can also rely on the inertia from the directional changes in the wire motion to detach liquid from the end of the wire, thereby stabilizing the rotational spray arc metal transfer.

Figure 1:
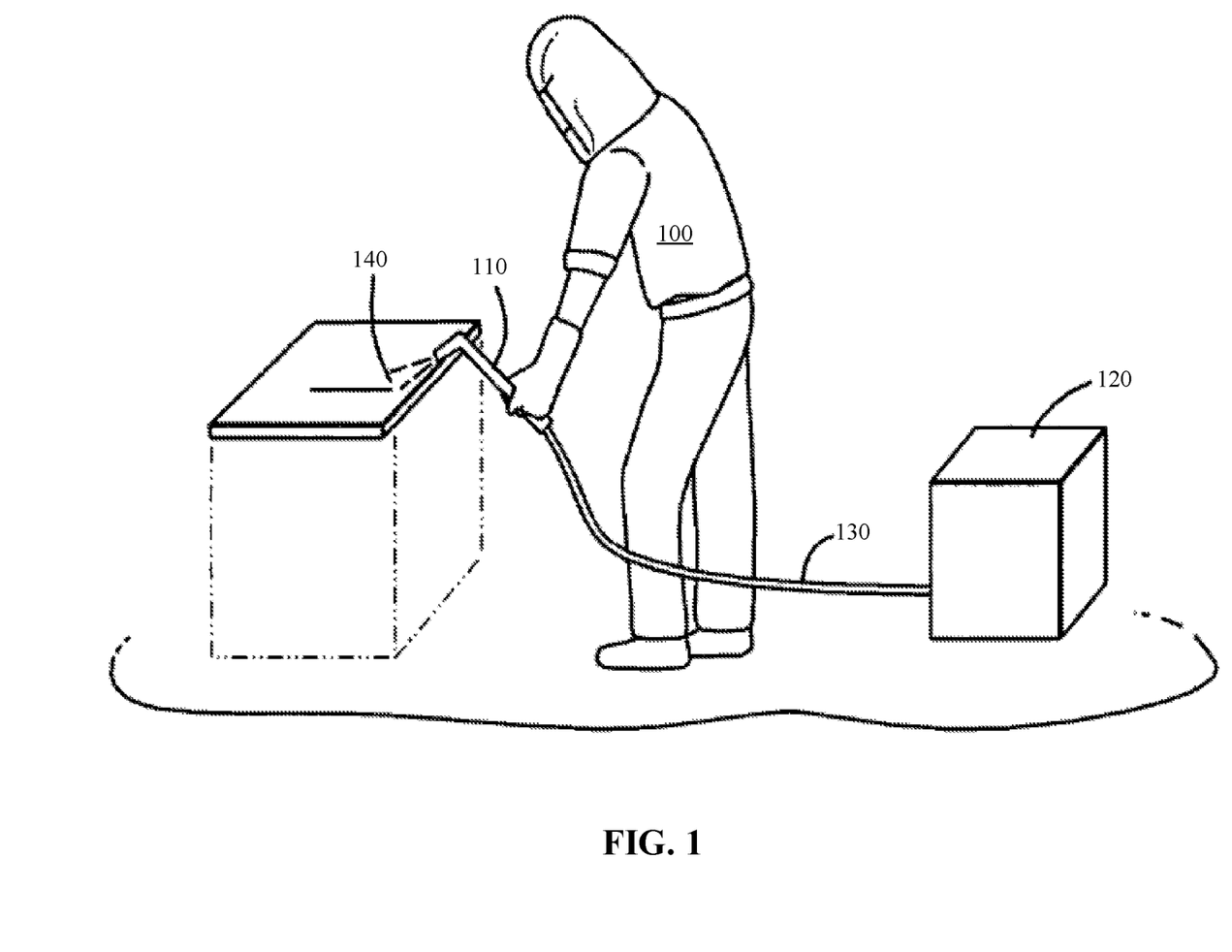
FIG. 1 shows an embodiment of a welding system according to the present disclosure.

FIG. 1 shows an embodiment of a welding system according to the present disclosure in which an operator 100 is holding a welding torch 110 (e.g., a welding gun) that is used in a welding application (e.g., a high deposition welding application). The welding torch 110 is coupled to a power supply 120 through a welding cable 130. In some embodiments, the welding power supply 120 and the welding cable 130 provide electrical power, shielding gas, and/or wire from an electrical source, a gas source, and a wire feeder, which are not shown, to the welding torch 110. The welding power supply 120 is also electrically connected to the workpiece 140.

Figure 2:
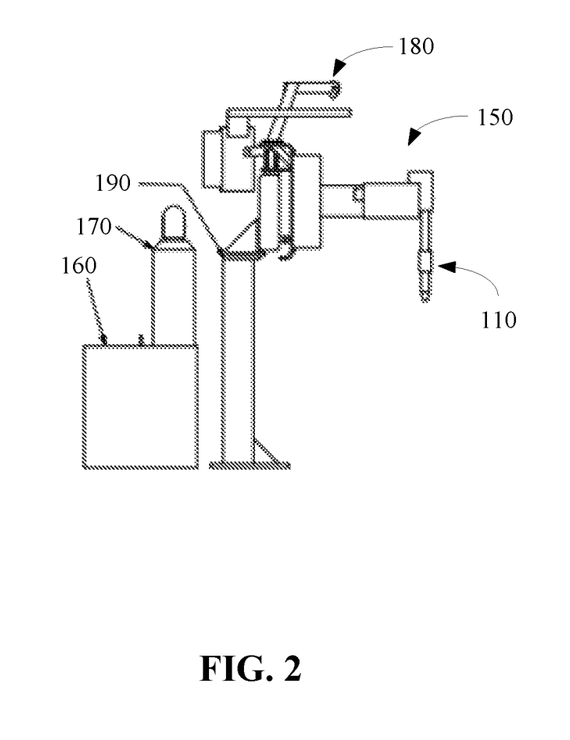
FIG. 2 shows another embodiment of the welding system according to the present disclosure.

FIG. 2 shows an embodiment of an automatic welding system according to the present disclosure in which a robotic arm 150 holds the welding torch 110. Referring to FIG. 2, the automatic welding system includes a welding power supply 160, a gas source 170, a spool support 180 for the wire spool (not shown), and a side beam 190 on which the torch bracket 150 rests.

Figure 3:
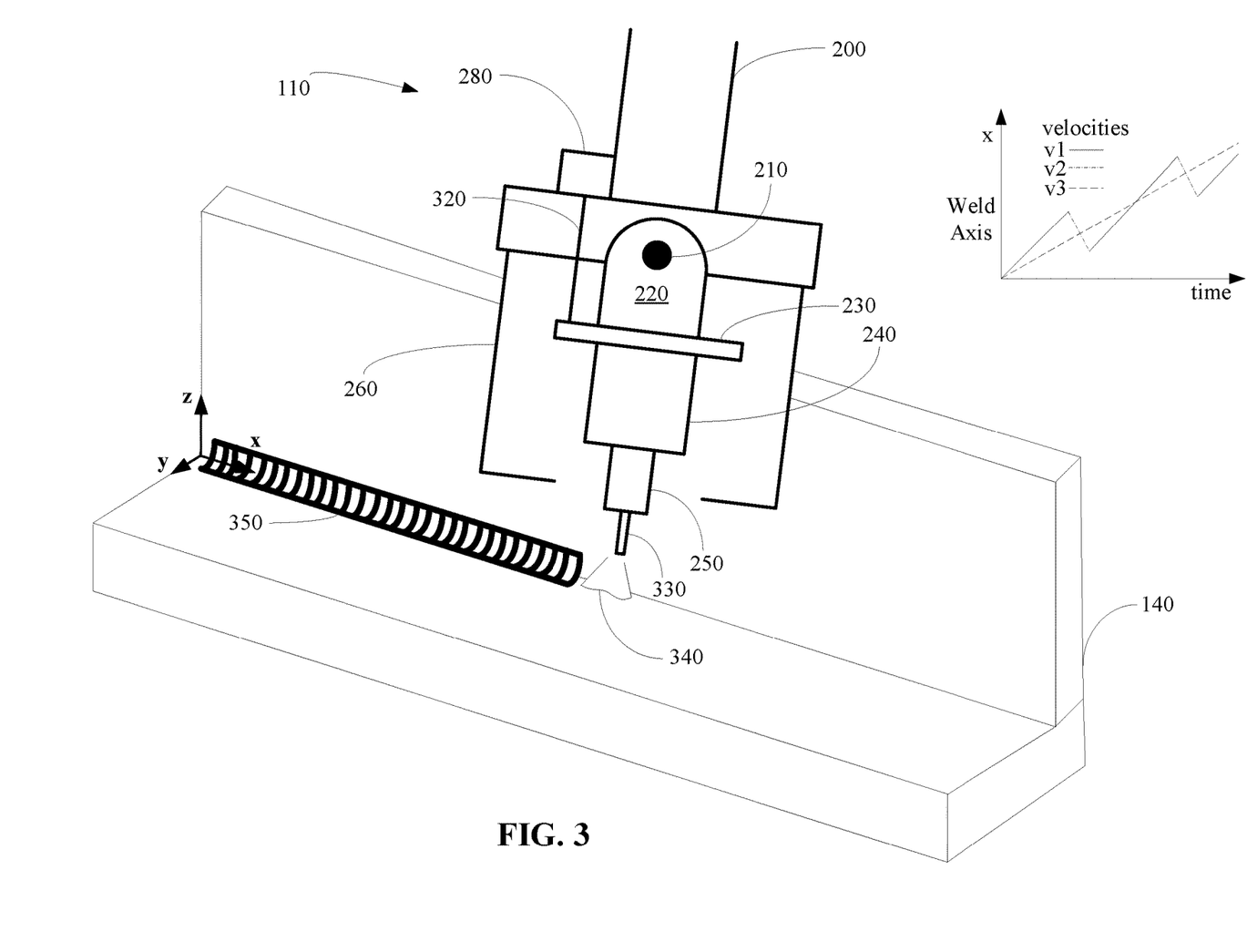
FIG. 3 shows a portion of an embodiment of a welding torch according to the present disclosure.

FIG. 3 shows a portion of an embodiment of the welding torch 110 that can be held by an operator as in FIG. 1, integrated with and/or held by a robotic arm, or integrated with and/or held by the torch bracket 150 as in FIG. 2. Referring to FIG. 3, the welding torch 110 includes a goose neck 200, a center of rotation such as a pivot or pivot point 210, a pivot support member 220, a gas diffuser 240, a contact tip 250, a gas nozzle 260, and a motor assembly 280. In some embodiments, the motor assembly 280 is part of or integrated with the welding torch 110 and, in other embodiments, the motor assembly 280 is on the outside of or separate from the welding torch 110.

Some embodiments provide that the welding torch 110 include a handle connected to a neck or goose neck 200 which, in turn, is connected to nozzle or gas nozzle 260. The handle can include, for example, a trigger that can control when the arc is formed and when the wire is fed. The goose neck 200 in FIG. 3 connects to the handle which connects to the welding cable 130 which, in turn, connects to the power supply 120, for example, as shown in FIG. 3. In an automatic welding system as in FIG. 2, the goose neck 200 is connected to the torch bracket 150 or to a robot mounting. The goose neck sub-assembly 200 provides voltage and/or current to the contact tip, shielding gas to the gas nozzle 260, and/or wire 330 through the contact tip 250.

Referring to again to FIG. 3, the goose neck 200 is connected to the gas nozzle 260. A pivot point 210 is formed by fixing a pivot support member 220 at the pivot point 210 so that the pivot support member 220 can move or swing around the pivot point 210. The pivot support member 220 ends in a flange 230 that provides a surface to receive a link 320 extending from the motor assembly 280. In some embodiments, the motor assembly is configured to cause the link 320 to go up and down, for example, thereby causing the flange 230, with which the link 320 is in contact, to move, swing, or rotate around the pivot point 230. The gas diffuser 240 is connected to the flange 230 of the pivot support member 220. The contact tip 250 extends out beyond the gas diffuser 240 and provides the wire 330, which is fed through the welding torch 110.

Figure 4:
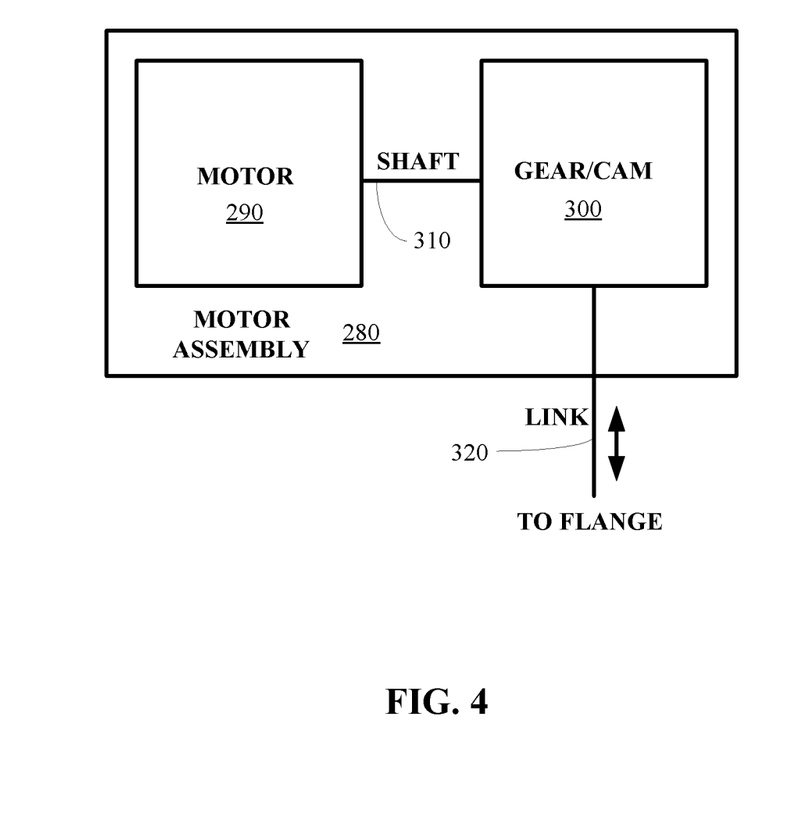
FIG. 4 shows an embodiment of a motor assembly according to the present disclosure.

FIG. 4 illustrates an embodiment of the motor assembly 280 according to the present disclosure. The motor assembly 280 can include, for example, a motor 290 and a cam and/or gear and/or crank 300 to convert rotational motion to linear motion. One example is using a cam. As the cam rotates, it converts rotational motion of a disk into the reciprocating linear motion of the link 320. Another example is crank or off-center connection to a rotating disk which is attached to the link 320. As the disk is spun by a motor, the crank converts rotational motion into back and forth linear motion of the link 320. Mechanisms like pinion/rack, ball screw, roller screw, leadscrew may be used. The motor 290 and the cam/gear/crank 300 can be connected through a shaft 310. The cam/gear/crank 300 is configured to act on the link 320, thereby causing the link 320 to go up and down, for example. In some embodiments, the motor 290 causes the shaft 310 to rotate, thereby causing the cam/gear/crank 300 to rotate. The rotating cam/gear/crank 300 acts on the link 320 to cause the link 320 to go up and down. In turn, the link 320 acts on the flange 230 to cause the pivot support member 220, the gas diffuser 240, the contact tip, and the wire 330 to move, swing, or rotate around the pivot point 210. In some embodiments, a wire shuttle can include one or more of the following: the flange 230, the pivot support member 220, the gas diffuser 240, the contact tip 250, the motor assembly 280, and/or the wire 330. In some embodiments, the flange 230 can be replaced with other mechanisms that can be configured to move (e.g., push, pull, tilt, rotate, etc.) the wire shuttle and, in particular, the wire 330 in one-, two-, and/or three-dimensions.

When the welding torch 110 is active during a welding operation, an arc 340 is formed from the wire 330 to the workpiece 140. As the welding torch 110 is moved along a torch direction or longitudinal weld axis, the motor assembly 280 causes the contact tip 250 and the wire 330 to move independently of that direction. FIG. 3 shows an example of a weave pattern (e.g., an inline weave pattern, a zig-zag pattern) being formed by the wire shuttle as the welding torch 110 is moved in a weld direction during a weld operation. FIG. 3 also shows the differing velocities of the wire 330 as a weave pattern is created. As the graph shows in FIG. 3, the velocity of the wire is changes during the weave pattern between a first velocity v1 and a second velocity v2. Velocity v3 is an average travel velocity. In some embodiments, there is a programmable motion pause when the travel direction is changed. In some embodiments, the motor assembly 280 can cause the wire shuttle to move back and forth along the weld direction. In some embodiments, the motor assembly 280 can cause the wire shuttle to move back and forth perpendicular to the travel direction. For example, in the case of hot wire laser cladding (e.g., without an arc), the zig-zag motion perpendicular to the travel direction can lay down heated filler metal in a wider swath that matches with the wider width of a laser that melts the workpiece surface. In some embodiments, the motor assembly 280 can cause the wire shuttle to move in directions other than along or perpendicular to the weld direction. In some embodiments, more complex weave patterns can be facilitated by using a pivot point 210 with multiple cams/gears/cranks 300 and links 320 connected to different parts of the flange 230 or other mechanisms to give the wire shuttle one-, two-, and/or three-dimensional freedom of movement.

Figure 5:
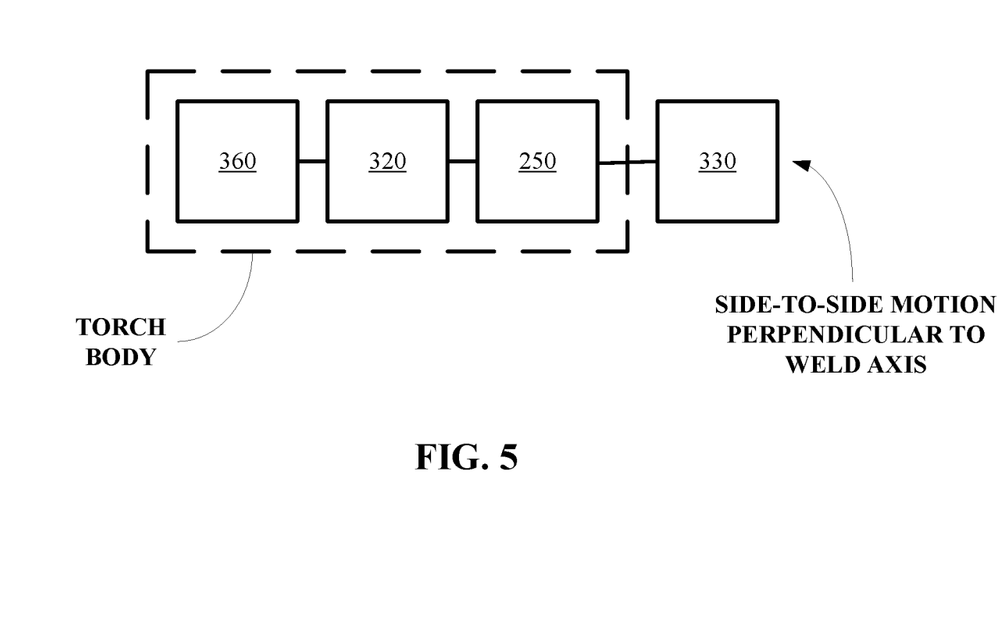
FIG. 5 shows an embodiment of a torch body according to the present disclosure.
Figure 6:
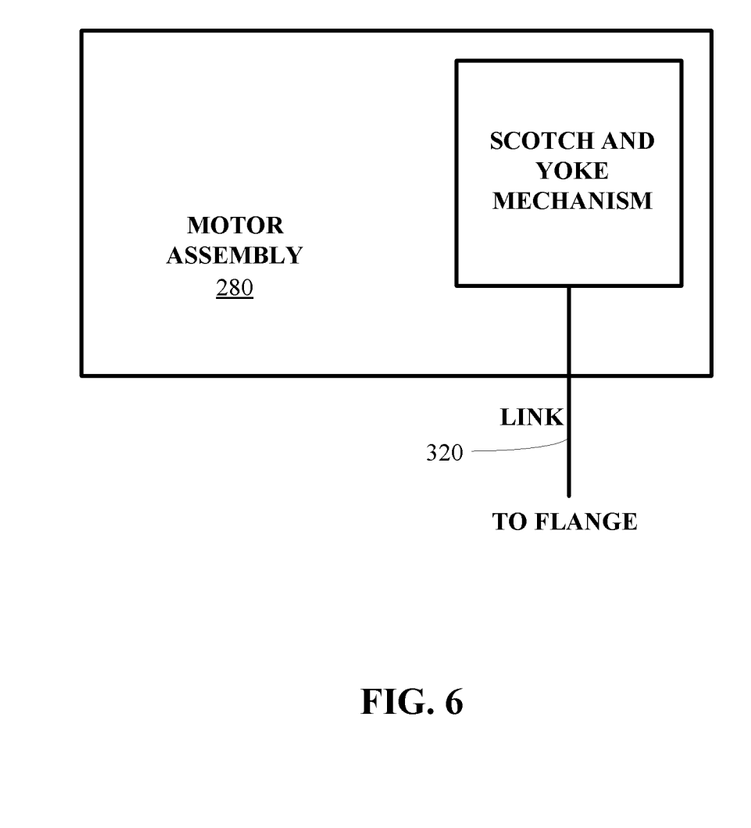
FIG. 6 shows an embodiment of a motor assembly according to the present disclosure.

FIG. 5 shows an embodiment of torch body that includes an actuator 360, the link 320, the contact tip 250, and the wire 330. The actuator 360, the link 320, and the contact tip 250 work together so that the wire 330 moves in a side-to-side motion that is, for example, perpendicular to the weld axis during a welding operation.

Some embodiments provide for a motor assembly 280 that employs the "Scotch and yoke" mechanism to convert unidirectional motor rotation into zig-zag oscillatory linear motion of the link 320. It is one of the kinematic inversions of mechanism of revolute and prismatic type of joints. Some embodiments provide for a motor assembly 280 the employs a slide-crank technique to convert unidirectional motor rotation into zig-zag oscillatory linear motion. A piezoelectric crystal actuator and/or a linear motor (e.g., voice coil or flat-coil actuator) can also be used for the actuator to move the link 320, thereby eliminating the need of the gear/cam/crank 300. A swing-arm actuator with flat or curved coils can be used to eliminate both the gear/cam/crank 300 and the link 320. Other alternative means not explicitly mentioned above to convert a rotational motion into linear motion or other type of motion are also contemplated by some embodiments of the present disclosure.

Some embodiments provide that, while an automatic welding system can be programmed, the programming need not include moving the welding torch 110 in a weave pattern, for example. The welding torch 110 need only be moved along the weld direction and the wire shuttle can, on its own, automatically form a welding weave pattern, zig-zag pattern, etc.

The motion control of the motor 290 and/or the motor assembly 280 can be such that there is dwell time at the ends of the stroke, typically between approximately 1-10 ms, for example. This can be beneficial to ensure that there is adequate time for the arc to pause at the ends of the stroke and for inertia-based liquid detachment to take place. The dwell is also advantageous with hot wire laser cladding to build a rectangular clad formation rather than a crown with slanted edges.

In some embodiments the motor assembly 280 provides position and/or velocity sensors so that it is possible to have feedback motion control. The sensors can include, for example, one or more of the following: an encoder, a resolver, an accelerometer, a linear variable differential transformer (LVDT), a rotary variable differential transformer (RVDT), a potentiometer, a proximity sensor, etc.

Some embodiments provide a tool-less ring/knob/slide as user interface on the gun to alter or adjust the zig-zag direction.

Some embodiments provide that an operator 100 need only move the welding torch 110 in a weld direction while the wire shuttle can, on its own, automatically form a welding weave pattern, zig-zag pattern, etc.

Some embodiments provide that the contact tip is configured to move, with respect to a torch body of a welding torch or a cladding torch, in a planar oscillatory movement during a welding operation. In some embodiments, the planar oscillatory movement can include, for example, an arc movement in a plane that coincides with a weld axis or a direction of travel of the torch body. In some embodiments, the planar oscillatory movement can include, for example, a linear motion. In some embodiments, the movement can be conical or circular. In some embodiments, the movement can occur with or without the use of a pivot.

Some embodiments provide that the single wire solution disclosed herein benefit from increased deposition and increased travel speed. Some embodiments provide that the single wire solution has some of the advantages (e.g., increased deposition, increased travel speed, etc.) of tandem welding without some of the disadvantages such as the interactions of two arcs and increased downtime.

Some embodiments contemplate using the wire shuttle in a variety of applications. For example, some embodiments provide for using the wire shuttle in a heavy plate, high deposition gas metal arc welding (GMAW) or flux-cored arc welding (FCAW) open arc welding. In addition, some embodiments provide for using the wire shuttle in SAW welding with a larger wire diameter using solid wire and metal core wire.

Some embodiments provide for spreading the heat out spatially in sufficient amplitude and temporally in sufficient speed to effectively create a lower effective energy density arc power distribution across a larger joint area to be welded in thin section welding or joints with variable gaps. The fast zig-zag motion of arc over a workpiece heat sink with conductive loss may create a thermodynamic effect of a uniformly spread out arc without localized overheating of the sidewalls. This avoids problems of undercut and instability in high deposition welding. It can also provide better gap sensing from side-to-side wire shuttle than from spin arc. The wire shuttle can be also activated or adaptively controlled when the gap is sensed (e.g., either through the arc or through an external laser scanner or other sensors). Furthermore, the zig-zag motion of the arc along the weld axis may slow down cooling rate at critical temperature ranges to reduce susceptibility to porosity and/or solidification cracking (e.g., possibly by re-melting the solidified weld metal).

Some embodiments provide for creating centrifugal force to facilitate metal transfer at high current levels. The movement reversal of the wire creates an inertial effect to detach the liquid off the end of the consumable electrode (liquid keeps moving in the same direction while the wire direction has reversed). This can be differentiated from spin arc or spin wire where there is no appreciable change of direction of wire movement to detach liquid from the wire end. This mitigates the problem of rotational spray where the liquid is tethered to the end of the solid consumable electrode unable to detach due to surface tension, etc. The end benefit is stable metal transfer at high deposition rate. Due to the additional metal transfer force, it is possible to weld with larger diameter wire and higher wire feed not possible in the past.

Some embodiments contemplate using electromagnets to cause arc rotation and spread out the arc. However the electromagnet could be very large to effectively move the arc to an amplitude of ¾" to 1". The bulkiness may limit joint access and restrict applications to few open joint such as panel lines in shipyard or pipe welding of large circumference. The cost could be higher than mechanical means to move the wire.

In some embodiments, the zig-zag motion is used to improve arc start. During conventional arc start, the wire is fed forward and touches the workpiece, and a surge of current ensues. When the wire end is sharp, the contact resistance is high, which often leads to a good arc start. However, when the wire end is dull, the contact resistance is low, which can often lead to a poor arc start—the high current blows away the wire like a flying baton. When the zig-zag motion is activated during arc start, this creates an unreliable contact between the wire and the workpiece, akin to a scratch start, thereby leading to high contact resistance and a reliable arc start.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A torch, comprising:
   a contact tip through which a welding wire is provided;
   a pivot support member that receives the contact tip, wherein the pivot support member is configured to move the contact tip around a pivot point during a welding operation;
   a motor assembly operatively coupled to the pivot support member, wherein the motor assembly is configured to move the pivot support member; and
   wherein:
      the pivot support member is configured to enable movement of the contact tip, at least in part, separately from and independently of a movement of the torch along a weld axis during the welding operation, wherein the movement of the contact tip is based on a welding pattern that comprises a plurality of different directions relative to the weld axis;
      the torch is configured to provide the welding wire at a plurality of different velocities, wherein each of the plurality of different velocities corresponds to one of the plurality of different directions, and wherein the plurality of different velocities results in a particular constant average travel velocity along the weld axis; and
      the motor assembly is configured to cause movement of the contact tip based on the plurality of different velocities to achieve providing the welding wire at each of the plurality of different velocities, wherein the causing comprises causing the contact tip to move in a different direction relative to the weld axis for each of the plurality of different velocities.

2. The torch according to claim 1, wherein the torch is moved in a first direction during the welding operation, and wherein the pivot support member is configured to automatically move the contact tip to form a weave welding pattern.

3. The torch according to claim 1, wherein the torch is moved in a first direction during the welding operation, and wherein the pivot support member is configured to automatically move the contact tip to form an inline weave welding pattern.

4. The torch according to claim 1, wherein the torch is moved in a first direction during the welding operation, and wherein the pivot support member is configured to automatically move the contact tip to form a zig zag welding pattern.

5. The torch according to claim 1, wherein the motor assembly is configured to move the pivot support member according to a plurality of strokes, wherein each stroke ends with a dwell time of between 1 and 10 milliseconds.

6. The torch according to claim 1, wherein the torch is configured to be manually held by an operator during the welding operation and to move in a first direction during the welding operation by the operator, and wherein the pivot support member is configured to move the contact tip in a second direction and a third direction during the welding operation.

7. The torch according to claim 1, wherein the torch is configured to be manually held by an operator during the welding operation and to move in a first direction during the welding operation by the operator, and wherein the pivot support member is configured to move the contact tip in the first direction and a second direction during the welding operation.

8. The torch according to claim 1, wherein the torch is part of a robot welding system, wherein the torch is configured to move in a first direction during the welding operation by a robot arm of the robot welding system, and wherein the pivot support member is configured to move the contact tip in a second direction and a third direction during the welding operation.

9. The torch according to claim 1, wherein the torch is part of a robot welding system, wherein the torch is configured to move in a first direction during the welding operation by a robot arm of the robot welding system, and wherein the pivot support member is configured to move the contact tip in the first direction and a second direction during the welding operation.

10. The torch according to claim 1, wherein the motor assembly includes a motor and one or more of the following: a gear, a cam, a scotch, and a yoke.

11. The torch according to claim 1, wherein the welding operation is an open arc operation using a consumable electrode.

12. The torch according to claim 11, wherein the welding operation is a gas metal arc welding (GMAW) operation or a flux-cored arc welding (FCAW) operation.

13. The torch according to claim 1, wherein the torch is configured to support using a consumable electrode during submerged arc based welding operation.

14. The torch according to claim 1, wherein the torch is a cladding torch configured to use a melt pool from a heat source during the welding operation.

15. The torch according to claim 14, wherein the torch is configured to add an unheated wire or a pre-heated wire to the melt pool during the welding operation.

16. The torch according to claim 14, wherein the heat source includes a laser, a plasma, or a tungsten inert gas (TIG) welding configuration.

17. The torch according to claim 1, wherein the motor assembly is configured to provide the welding wire at each of the plurality of different velocities during the welding operation.

* * * * *